United States Patent [19]

Thompson-Russell et al.

[11] Patent Number: 4,820,225

[45] Date of Patent: Apr. 11, 1989

[54] METHOD OF SEALING A PUMP STEM TO A CATHODE RAY TUBE ENVELOPE PART

[75] Inventors: Kathryn C. Thompson-Russell, Eindhoven, Netherlands; Roger A. Black, Retford, United Kingdom

[73] Assignee: U.S. Philips Corporation, New York, N.Y.

[21] Appl. No.: 855,235

[22] Filed: Apr. 24, 1986

[30] Foreign Application Priority Data

May 8, 1985 [GB] United Kingdom ................. 8511637

[51] Int. Cl.[4] .......................... B23K 27/00; H01J 9/26

[52] U.S. Cl. ....................................... 445/43; 228/113

[58] Field of Search .................. 445/43; 228/174, 160, 228/112, 113

[56] References Cited

U.S. PATENT DOCUMENTS

| | | | |
|---|---|---|---|
| 3,147,053 | 9/1964 | Phelps | 445/43 |
| 3,451,121 | 6/1969 | Yocum | 228/113 |
| 3,477,116 | 11/1969 | Calton | 228/113 |
| 3,485,931 | 12/1969 | Williams | 445/43 |
| 3,916,518 | 11/1975 | Jones | 228/113 |
| 4,512,488 | 4/1985 | Schwenk | 445/43 |

FOREIGN PATENT DOCUMENTS

| | | | |
|---|---|---|---|
| 2307002 | 8/1974 | Fed. Rep. of Germany | 228/113 |
| 0837678 | 6/1981 | U.S.S.R. | 228/113 |
| 1390821 | 4/1975 | United Kingdom | 228/113 |

*Primary Examiner*—Kurt Rowan

*Attorney, Agent, or Firm*—John C. Fox

[57] ABSTRACT

A cathode ray display tube has a mild steel envelope part (10) with a tubular copper pump stem (20) sealingly attached thereto by friction welding. A method of attaching the pump stem involves forming the pump stem initially with a closed end, rotating the pump stem relative to and against the mild steel envelope part and applying pressure to cause friction welding of the pump stem, and thereafter extending the pump stem's bore through its closed end by drilling. A hole may simultaneously be drilled through the envelope part. The friction weld provides reliable vacuum-tightness and strength, and the attachment of the pump stem in this manner can be accomplished using automation quickly and inexpensively.

12 Claims, 1 Drawing Sheet

METHOD OF SEALING A PUMP STEM TO A CATHODE RAY TUBE ENVELOPE PART

BACKGROUND OF THE INVENTION

This invention relates to a method of sealing a generally tubular, pump stem in a vacuum-tight manner to a mild steel envelope part of a cathode ray tube and to a cathode ray tube display having a mild steel envelope part with a pump stem attached thereto.

Metal envelope parts, or "cans" as they are sometimes known, are used as cones constituting part of the vacuum housing in cathode ray tubes having flat or nearly flat glass faceplates. Such a cathode ray tube may be, for example, a television display tube or a datagraphic display tube. The term "cone" is used in this specification to include envelope parts which are not wholly conical in configuration, but are described by this term in the cathode ray tube art.

The tube is assembled by securing the glass faceplate to the metal cone in a vacuum-tight manner, the operative components of the tube, for example, one or more electron guns, being contained within the envelope and arranged to direct an electron beam towards a fluorescent screen carried on the face-plate. The pump stem is provided for attachment to a pumping apparatus to enable air within the envelope to be pumped out and a vacuum created. The end of the pump stem is thereafter closed in a vacuum-tight manner to prevent loss of the vacuum.

Metals which have been used to form such cones include Fe—Ni—Co or Fe—Ni—Cr alloys. However these alloys tend to be expensive and difficult to form. In order to make economical and implosion-safe vacuum envelopes for flat or nearly flat faceplate cathode ray tubes, a deep drawn mild steel cone is advantageous since it is easy to form, of low cost and ideal for design flexibility. A simple and inexpensive way to seal the glass faceplate to the metal cone is by means of pressure bonding using lead or lead alloys as a malleable metal layer. An example of such a technique is described in British patent specification No. 1598888. The presence of a lead bond between the metal cone and glass faceplate limits the temperature to which the tube can be subjected to a maximum of around 300° C. It is customary however to pump tubes at around 360° C. in order to assist quick evacuation. In order therefore to facilitate reaching the required low pressure in the envelope within an economical pumping time at the required lower temperature, a large diameter pump stem is desirable, the actual size being dependent on the envelope volume. Following evacuation of the envelope, the pump stem is sealed.

There are difficulties in sealing such pump stems to mild steel cones in a reliable and cost-effective manner. A known general sealing/joining technique involves silver soldering. However the adoption of such a technique as a means of attaching and sealing pump stems to mild steel cones has a number of disadvantages; the silver solder is expensive, and precise machining of the pump stem and accurate forming of at least that region of the cone where the pump stem is to be attached would be necessary. Moreover, the attachment operation would require a heat treatment of 700° to 800° C., which, besides energy demanding, would be harmful to the mechanical properties of the cone and cause oxidation of the mild steel.

It is one object of the present invention to provide a quick an comparatively inexpensive method of sealing a pump stem to a mild steel envelope part of a cathode ray tube in a reliably vacuum tight manner which is suitable for mass production and which also lends itself to automation.

It is a further object of the invention to provide a cathode ray tube display having a pump stem attached to a metal envelope part thereof in a reliable and inexpensive manner.

SUMMARY OF THE INVENTION

According to one aspect of the present invention there is provided a cathode ray tube display having an envelope part of mild steel with a sealed pump stem attached thereto which is characterised in that the pump stem is friction welded onto the mild steel envelope part.

In being friction welded, the pump stem is reliably and inexpensively sealed to the envelope part with the friction weld ensuring adequate vacuum-tightness and mechanical strength. The heat produced during friction welding is localised so that no significant damage is caused to the envelope part even at the surrounding area.

Preferably, the pump stem is formed of copper. Such material is advantageous in that it can be friction welded easily and in addition can be readily pinched-off and sealed mechanically between two rollers following evacuation of the envelope.

According to another aspect of the present invention, there is provided a method of sealing a generally tubular pump stem in a vacuum-tight manner to a mild steel envelope part or a cathode ray tube, characterised by the steps of forming the generally tubular pump stem with a closed end, rotating the pump stem around its axis and relative to the envelope part and forcing the closed end of the pump stem against the surface of the envelope part so as to cause the closed end of the pump stem and the envelope part to be friction welded and sealed together, and thereafter extending the bore of the generally tubular pump stem through the closed end.

It has been found that, using this method, pump stems can be sealed to the mild steel envelope part in a quick, efficient and reliable way, and at low cost. The vacuum-tight seal formed by friction welding is entirely adequate for the requirements of a cathode ray tube, the leak rate being so small that there would be no appreciable effect on the operation of the cathode ray tube over a period of years. Moreover, the bond between the pump stem and envelope part is sufficiently strong mechanically to withstand the mechanical stresses subjected to the bond when the pump stem is subsequently pinched off, even if the pinching off occurs relatively close to the envelope part. Furthermore, the steps involved in the method according to the invention are ideally suited to mass production techniques and readily lend themselves to full automation.

The use of friction welding is particularly advantageous in that it is to some extent tolerant of the pre-weld interface conditions. Within reason, roughly formed mating surfaces without significant grease contamination and, in the case of the mild steel envelope part, with a small degree of oxidation, can be used without affecting substantially weld strength and sealing. This is because during the rotational phase of friction welding the area to be welded is scoured and impurities removed by this action. As the rotational phase continues, irregularities of the pump stem's mating face are smoothed out by frictional contact and pressure. As the friction-generated heat increases, the pump stem material becomes plastic and intimate contact between the mating materials results.

Preferably, the generally tubular pump stem is formed of copper. Besides being suited to friction welding, this has the advantage of enabling the pump stem to be readily pinched-off and sealed mechanically between two rollers following evacuation of the envelope.

In view of the need to be able to pinch off the pump stem, the wall thickness of the generally tubular pump stem in a preferred embodiment is chosen so as not to exceed 1.5 mm, and preferably is around approximately 1 mm, in order to keep the applied pinching pressure and the size of the pinching rollers necessary within reasonable limits. The internal diameter of the pump stem may be around 6 to 10 mm, depending on the envelope volume, for optimum evacuation performance. By forming the generally tubular pump stem with a closed end in accordance with the invention, it has been found that satisfactory vacuum-tight friction welding is repeatedly achievable when using such relatively thin-walled pump stems. Experiments using simple open-end tubular pump stems indicated that a mechanically strong friction weld having good vacuum-tightness could not be accomplished reliably. It is believed that heat loss during friction welding was in this case so great that the weld area was not able to attain the required high temperature whereas with a pump stem having a solid, closed end the heat loss is retarded thereby enabling the critical temperature to be reached.

In a preferred embodiment the generally tubular pump stem is formed such that the thickness of the wall closing the end of the pump stem is 5 to 15 times the thickness of the tubular wall. The end wall of the pump stem prior to friction welding may have an external diameter greater than the outside diameter of the tubular wall of the pump stem.

The tubular pump stem may conveniently be formed by means of incomplete extrusion of a pellet.

The step of forcing the pump stem against the envelope part may comprise forcing the pump stem against the envelope part under a first pressure whilst relatively rotating the pump stem and envelope part until the engaging pump stem surface is rendered plastic and thereafter stopping relative rotation and forcing the pump stem against the envelope part under a second, higher, forging pressure before effective cooling occurs.

The step of extending the bore of the generally tubular pump stem through the closed end may comprise drilling through the closed end axially of the bore of the pump stem. Conveniently, a hole may be drilled also through the envelope part at the same time. In order to prevent as far as possible the interior of the pump stem from being contaminated by foreign metallic particles coming from the drill, which could hinder the formation of a vacuum tight pinch seal, drilling preferably is effected from the envelope part side.

BRIEF DESCRIPTION OF THE DRAWINGS

A method of sealing a generally tubular pump stem in a vacuum-tight manner to a mild steel envelope part of a cathode ray tube and a cathode ray tube display having an envelope part with a pump stem attached thereto, in accordance with the invention, will now be described, by way of example, with reference to the accompanying drawing in which.

DESCRIPTION OF THE PREFERRED EMBODIMENTS

Figure 1:
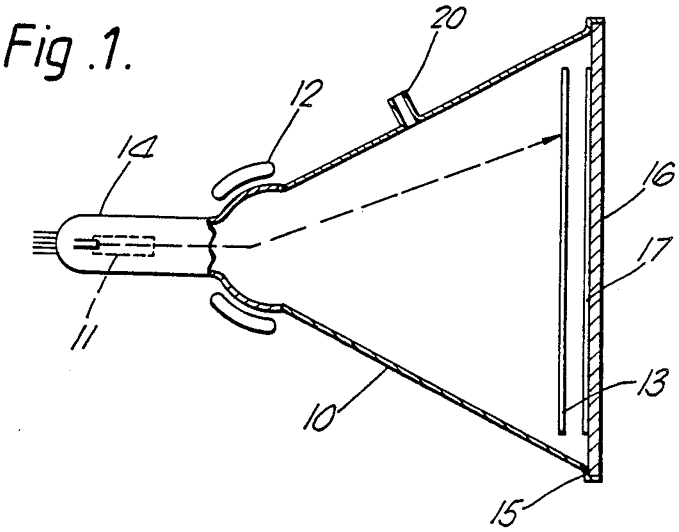
FIG. 1 shows schematically a section through a cathode ray tube display having a mild steel envelope part and a substantially flat glass faceplate.

Referring to FIG. 1, the cathode ray tube display shown schematically has a generally frusto-conical cone 10, constituting the envelope part, of 1.5 mm thick deep-drawn mild steel which carries internally a supporting structure for a shadow mask 13. A glass neck 14 containing an integrated electron gun 11 and having a diverging end portion is sealingly attached to one end of the cone 10. Associated deflection coils, referenced at 12, are located around the end portion of the glass neck 14. The cone 10 presents a generally rectangular opening bordered by a peripheral flange 15 on which a substantially flat glass faceplate 16 is mounted and sealed. The faceplate 16 carries on its internal surface a fluorescent screen 17 upon which electron beams from the integrated electron gun impinge to produce a display. The cathode ray tube may be for use as a television display or a datagraphic display.

A generally tubular pump stem 20 of annealed OF copper is mounted on the cone 10 and sealed thereto in vacuum-tight manner according to the invention. Following assembly of the components inside the tube and the mounting of the faceplate 16 and neck 14 on the cone 10, a pumping apparatus is connected to the free end of the pump stem to evacuate air from the inside of the envelope defined by the neck 14, envelope part 10 and the faceplate 16. Thereafter, the pump stem is pinched off and sealed between two cylinders in a conventional manner, the pinched-off end possibly also being dipped in solder as an additional precaution, so as to maintain low pressure within the tube envelope.

Figure 2:
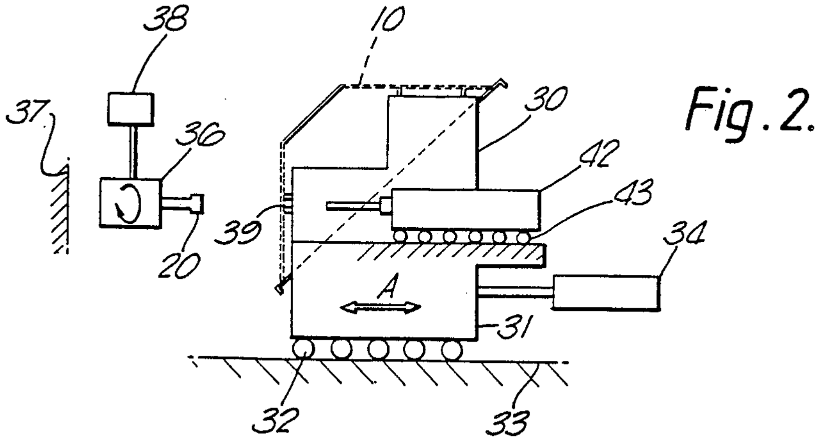
FIG. 2 is a schematic representation of apparatus used for mounting and sealing a pump stem on the envelope part of a cathode ray tube.

The pump stem 20 is mounted on the cone 10 and sealed therewith using the apparatus depicted schematically in FIG. 2. For simplicity, there is shown in this figure a deep drawn cone, again referenced 10, of similar configuration to that of FIG. 1, having four, sloping, flat sides terminating in a circular opening at one end and presenting a rectangular opening at its other end. It will be appreciated that various cone configurations may be used, those illustrated in FIGS. 1 and 2 serving as examples only.

Figure 3:
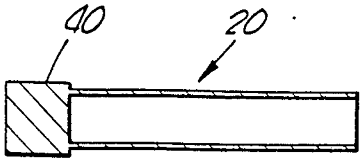
FIG. 3 is an enlarged sectional view through one example of a generally tubular pump stem which is to be sealed to the envelope part of the cathode ray tube.

The cone 10 is supported by, and clamped on, a suitably profiled jig 30 providing surfaces which lie against and correspond in shape with sides surfaces of the cone 10. The jig 30 is mounted on a carriage 31 which is supported by bearings 32 on a fixed surface 33 and movable, as indicated at A, by means of a hydraulic ram 34. The pump stem 20 is clamped in a rotatable clamping head 36 whose position is fixed with respect to a supporting surface 37, and which is driven over a gear-belt by an electric motor 38 with a combined brake so as to rotate the pump stem around its axis. The initial form of one example of the pump stem 20 is shown in greater detail in FIG. 3. The pump stem 20 is fabricated as an incomplete extrusion of a pellet of OF copper and comprises a generally tubular member with a comparatively thick cylindrical wall 40 closing one end. The member is approximately 60 mm long with the end wall 40 being around 12 mm thick, that is, axially of the member. The thickness of the end wall 40 may however vary between 5 and 15 mm as may be needed to suit differing circumstances. The overall diameter of the end wall 40, in the example shown, is slightly greater than that of the remainder of the member, the latter having an outside diameter of around 10 mm and a wall thickness of around 1 mm.

The form and dimensions of the member may be varied. For example, a member approximately 52 mm long, having an internal bore of 8.5 mm diameter, a plain cylindrical outer surface of 11 mm diameter along the complete length of the member (i.e. there is no increase in outer diameter at the end wall), and an end wall of 7.5 mm thickness measured axially of the member has been used with successful results.

To mount and seal the pump stem 20 on the cone 10, the head 36 is rotated to a speed of 3720 r.p.m. by the motor 38 and the carriage 31 moved with respect to the rotating head 36 by the ram 34 to bring that portion of the surface of the cone on which the pump stem is to be mounted into contact with the rotating surface of the end wall 40 of the pump stem and force those surfaces together at a pressure of around 6 bar applied axially of the pump stem. The vertical surface of the jig 30 facing the head 36 acts as a supporting backstop. After a while, typically around one or two seconds duration, the interface temperature caused by friction increases to a value at which the copper material at the relatively rotating faces becomes plastic and heated material begins to be extruded from the interface to form a collar. At this point rotation of the pump stem is rapidly stopped by braking the motor 38 and the pressure between the pump stem 20 and cone 10 increased to around 38 bar by the ram 34 in order to forge the components together before effective cooling of the parts occurs, the pressure being maintained while the components cool, usually around a few seconds. (The forging pressure may be varied between 20 and 40 bar depending on the hardness of the copper used.) The "burn off" of the stem pump, that is the effective decrease in length of the pump stem obtained by the friction welding process, amounts to some 3.0 mm.

To maintain heat loss during friction welding and therefore ensure welding heat is obtained as quickly as possible, the supporting backstop of the jig is of heat insulative material, for example, resin. In addition, an annulus 39 of insulative material is disposed on the face of the supporting backstop directly behind that part of the cone 10 on which the pump stem is to be mounted to maintain that part slightly spaced from the remainder of the jig. The annulus 39 is arranged coaxially with the pump stem and has an internal diameter of 6 mm and an external diameter of 12.5 mm.

Following the friction welding operation to seal the pump stem 20 on the cone 10, a hole is drilled through what remains of the end wall 40 of the pump stem, and also through the wall of the cone 10 and any unwanted flash at the same time, so that the bore of the pump stem communicates with the interior of the cone 10. Referring again to FIG. 2, this is accomplished by means of a drill tool 42 mounted by bearings 43 for movement across the carriage 31, the drill bit being slightly smaller than the pump stem's bore and aligned with the axis of the pump stem. The drill tool is moved towards the pump stem so that it drills firstly through the wall of the cone 20 and then through the remains of the end wall of the pump stem 10. In this way the risk of contamination of the bore of the pump stem by metallic particles from the drill bit is minimised.

Thereafter, the drill tool 42 is displaced away from the pump stem, the clamping head 36 is released from the pump stem and the carriage 32 moved back to allow the cone 10, with the attached pump stem 20, to be removed from the jig 30.

The cathode ray tube is completed by installing the internal components of the tube, mounting the neck 14 and glass faceplate 16, and assembling the deflection coils 12. The pump stem is connected to a pumping apparatus to withdraw air from the envelope defined by the cone 10, neck 14 and faceplate 16 and subsequently pinched off way thereby sealing the envelope.

It has been found that friction welding of the pump stem to the metal cone in the described manner provides a strong mechanical join, easily sufficient to withstand the mechanical stress caused during pinching off, and reliable vacuum tightness.

As mentioned previously, the method according to the invention may be used for mounting and sealing a pump stem on a variety of cones having different configurations. The pump stem may easily be mounted on a flat surface of the cone, as shown in FIG. 1, or possibly a curved surface, it being preferable in the latter case that the pump stem be arranged with its axis passing through the centre of curvature of the cone portion on which it is to be mounted so as to ensure symmetrical contact and therefore good welding and sealing. More complex configurations of cones may be used, for example having a combination of rectangular and curved profiles. A glass neck portion containing the electron gun need not be used. Instead the metal cone 10 may be open at the faceplate end only and the electron gun and deflection coils carried internally of the cone 10 by means of a supporting structure. Moreover, the method may be utilised to mount and seal a pump stem on a generally rectangular "cone" for example as used in the flat display cathode ray tube described in Published British patent application No. 2101396.

What is claimed is:

1. A method of sealing a generally tubular pump stem in a vacuum-tight manner to a mild steel envelope part of a cathode ray tube, characterised by the steps of forming the generally tubular pump stem with a closed end, rotating the pump stem around its axis and relative to the envelope part and forcing the closed end of the pump stem against the surface of the envelope part so as to cause the closed end of the pump stem and the envelope part to be friction welded and sealed together, and thereafter extending the bore of the generally tubular pump stem through the closed end.

2. A method according to claim 1, wherein the generally tubular pump stem is formed of copper.

3. A method according to claim 1 or 2, wherein the wall closing the end of the pump stem has thickness measured axially of the pump stem of between 5 and 15 times the tubular wall thickness of the pump stem.

4. A method according to, claim 1 or 2 wherein the wall closing the end of the pump stem prior to the friction welding step has an external diameter greater than that of the tubular wall of the pump stem.

5. A method according to, claim 1 or 2 wherein the generally tubular pump stem is formed by means of incomplete extrusion of a pellet.

6. A method according to, claim 1 or 2 wherein the tubular wall thickness of the pump stem is around 1 mm.

7. A method according to, claim 1 or 2 wherein the external diameter of the tubular wall of the pump stem is around 10 mm.

8. A method according to, claim 1 or 2 wherein the step of forcing the pump stem against the envelope part comprises forcing the pump stem against the envelope part under a first pressure whilst relatively rotating the pump stem and envelope part until the engaging pump stem surface is rendered plastic and thereafter stopping relative rotation and forcing the pump stem against the envelope part under a second, higher, forging pressure before effective cooling occurs.

9. A method according to, claim 1 or 2 wherein the step of extending the bore of the generally tubular pump stem comprises drilling through the closed end axially of the bore of the pump stem.

10. A method according to claim 9, wherein the drilling step includes drilling a hole through the envelope part coaxial with the bore of the pump stem at the same time.

11. A method according to, claim 1 or 2 wherein the surface of the envelope part remote from the pump stem and adjacent the area thereof against which the pump stem is forced during the friction welding step is supported during at least the friction welding step by a member of heat insulative material.

12. A method according to claim 11, wherein the heat insulative member is annular with the outer diameter around that of the pump stem and engages the surface of the envelope part coaxially with the pump stem.

* * * * *